US006996642B2

(12) United States Patent
Apperley et al.

(10) Patent No.: US 6,996,642 B2
(45) Date of Patent: Feb. 7, 2006

(54) ADAPTER, CONVERTED DATA STORAGE DEVICE AND METHOD OF OPERATION OF A CONVERTED DATA STORAGE DEVICE

(75) Inventors: Norman Apperley, Chandlers Ford (GB); Stephen Peter Legg, Southhampton (GB); Vinay V. Shah, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 10/115,726

(22) Filed: Apr. 2, 2002

(65) Prior Publication Data

US 2003/0188084 A1    Oct. 2, 2003

(51) Int. Cl.
G06F 13/12    (2006.01)
G06F 13/38    (2006.01)
G06F 13/20    (2006.01)
G06F 13/36    (2006.01)

(52) U.S. Cl. .................. 710/74; 710/315; 710/313
(58) Field of Classification Search ................ 710/305, 710/300–301, 303, 62, 74, 72, 313–315; 709/211, 230
See application file for complete search history.

(56) References Cited

U.S. PATENT DOCUMENTS

| 5,790,374 | A  | * | 8/1998 | Wong ........................ 361/685 |
| 6,041,381 | A  |   | 3/2000 | Hoese ........................ 710/315 |
| 6,209,023 | B1 | * | 3/2001 | Dimitroff et al. ........... 709/211 |
| 6,442,022 | B1 | * | 8/2002 | Paul ............................ 361/685 |
| 6,859,896 | B2 |   | 2/2005 | Apperley et al. ............. 714/48 |
| 6,862,648 | B2 |   | 3/2005 | Yatziv ........................ 710/315 |
| 2002/0062387 | A1 | * | 5/2002 | Yatziv ........................ 709/236 |
| 2002/0160729 | A1 | * | 10/2002 | Patterson et al. ........... 455/115 |
| 2003/0128699 | A1 | * | 7/2003 | Reams ........................ 370/389 |
| 2003/0133263 | A1 | * | 7/2003 | Shu ............................ 361/685 |

OTHER PUBLICATIONS

"Webopedia Online Computer Dictionary for Computer and Internet Terms and Definitions". Entry 'machine language'. Online Nov. 16, 2001. Retrieved Jun. 30, 2004. <http://www.webopedia.com/TERM/m/machine/machine_language.html>.*
"Webopedia Online Computer Dictionary for Computer and Internet Terms and Definitions". Entry 'microcode'. Online Oct. 30, 2001. Retrieved Jun. 30, 2004. <http://www.webopedia.com/TERM/m/machine/micrcode.html>.*

* cited by examiner

Primary Examiner—Khanh Dang
Assistant Examiner—Thomas J. Cleary
(74) Attorney, Agent, or Firm—Lewis L. Nunnelly; William D. Gill (57) ABSTRACT

An adapter for converting an interface of a data storage device is provided. The adapter has a first interface for connection to the interface of the data storage device and a second interface for connection to one or more host systems. The adapter includes a processor for converting commands and data between the first and second interfaces. The adapter transforms the data storage device to emulate physically and logically a higher availability and higher performance native data storage device. The adapter has a first connector compatible with the first interface for attachment to the data storage device and a second connector compatible with the second interface for attachment to the one or more host systems. The first and second connectors are disposed in the adapter in a back to back arrangement. The adapter logically separates commands for the data storage device from commands for the adapter.

29 Claims, 5 Drawing Sheets

ADAPTER, CONVERTED DATA STORAGE DEVICE AND METHOD OF OPERATION OF A CONVERTED DATA STORAGE DEVICE

FIELD OF THE INVENTION

This invention relates in general to interfaces between computers and peripheral data storage devices and more particularly to an adapter, a converted data storage device, and a method of operation of a converted data storage device enabling high function interface capabilities for data storage devices.

BACKGROUND OF THE INVENTION

Low cost or commodity disk drives are predominantly used with single host systems. Popular disk drive interfaces for such low cost disk drives include, for example, SCSI (Small Computer System Interface) or ATA (Advanced Technology or AT Attachment). These disk drives may have a very high capacity and have high performance characteristics when attached to a single system.

The majority of commodity disk drives only attach to a single host system with a simple interface that does not enable the disk drive to be used where access is required from multiple host systems. The ATA interface can only attach a disk drive to a single host system. SCSI interfaces architecturally permit multiple host systems at the expense of reducing the number of disks possible. Usually, SCSI interfaces are used on single host systems or, at the most, with two host systems. Such attachment interfaces to commodity disk drives have limitations when used for high function, high availability systems.

One interface choice for multiple host systems is SSA (Serial Storage Architecture) which is designed for multiple host systems on the same loop and includes functions to retain availability of the network when systems or disks fail. With SSA, malfunctioning systems can be fenced out to permit all the other systems to continue operation. SSA networks are cabled as a loop, so any failure of a disk drive will not prevent all the systems from continuing to operate to all the other disk drives. To improve performance in SSA, data is sent on separate wires from those used to receive data. Data can therefore be sent and received concurrently by any node. Another example of an interface which supports multiple hosts is the FC-AL (Fibre Channel Arbitrated Loop) interface.

The current solution to the requirement of connection of disk drives to multiple hosts is to use a special disk drive with a native SSA or FC-AL interface. Such so called native disk drives are made in much lower volumes than commodity disk drives and they are only available from a few suppliers, so they cost significantly more. A native disk drive also requires development resources for each new generation of recording technology and therefore the availability date of such disk drives tends to lag behind commodity disk drives.

What is needed is a low cost, commodity disk drive capable of being connected to multiple hosts and used in server applications. It is also desired that the interface can support multiple initiators. Also it is desired that the upper level protocol have certain features to allow concurrent access by several hosts.

SUMMARY OF THE INVENTION

An embodiment of the present invention provides an adapter used to connect a commodity disk drive to a different interface that has a higher function capability than is available with the interface native to the disk drive.

It is an aim of the present invention to provide for converting data storage devices, such as commodity low cost disk drives, to an interface which provides increased availability and performance.

In one embodiment of the present invention there is provided an adapter for converting an interface of a data storage device, the adapter comprising: a first interface for connection to the interface of the data storage device; a second interface for connection to one or more host systems; a processor including conversion means for converting commands and data between the first and second interfaces; wherein the adapter transforms the data storage device to emulate physically and logically a higher availability and higher performance native data storage device, the adapter having a first connector compatible with the first interface for attachment to the data storage device and a second connector compatible with the second interface for attachment to the one or more host systems, the first and second connectors being disposed in the adapter in a back to back arrangement and the adapter logically separating from commands destined for the data storage device, data destined for the adapter.

In one embodiment the invented adapter may comprise a printed circuit board with the first connector mounted on a first surface of the printed circuit board and the second connector mounted on a second surface of the printed circuit board, wherein the first and second connectors are disposed on supports mounted with mounting pins through the printed circuit board. In an alternative embodiment, the first and second connectors may be mounted on separate printed circuit boards and interconnected by some means.

In one embodiment, the adapter is preferably mountable within a data storage device housing with the second connector disposed available for attachment to the one or more host systems via the second interface. The adapter may be mountable within a carrier housing for a data storage device in the form of a disk drive such that the disk drive and adapter physically emulate a disk drive with a native second interface.

In another embodiment, the adapter may have one or more indicator device and a transmission means for transmitting the indication to the exterior of the carrier. The indicator device may be an LED and the transmission means is a light pipe.

In one embodiment, the adapter may provide power to the data storage device through the first and second connectors and power for consumption locally by the adapter is regulated from a 12 Volt supply in order to emulate the power consumption of a native data storage device.

In the prefered embodiment, the first interface may be a single host interface such as an ATA interface or the first interface may be a parallel interface such as a SCSI interface. The second interface may be a serial multiple host interface such as a SSA or a FC-AL interface.

According to another embodiment of the present invention there is provided a converted data storage device comprising an adapter and a data storage device, the data storage device having a first interface and the adapter converting the first interface to a second interface, the adapter comprising: a first interface for connection to the interface of the data storage device; a second interface for connection to one or more host systems; a processor including conversion means for converting commands and data between the first and second interfaces; wherein the adapter transforms the data storage device to emulate physically and logically a higher availability and higher performance native data storage device, the adapter having a first connector compatible with the first interface for attachment to the data storage device and a second connector compatible with the second interface for attachment to the one or more host systems, the first and second connectors being disposed in the adapter in a back to back arrangement and the adapter logically separating from commands destined for the data storage device, data destined for the adapter.

In the prefered embodiment, the adapter is removable from the data storage device. The adapter may be mountable within a housing of the data storage device with the second connector disposed available for attachment to the one or more host systems via the second interface. The adapter may be mountable within a carrier housing for a data storage device in the form of a disk drive such that the disk drive and adapter physically emulate a disk drive with a native second interface.

In one embodiment, the adapter may have one or more indicator device and a transmission means for transmitting the indication to the exterior of the carrier. The indicator device may be an LED and the transmission means is a light pipe.

In one embodiment, the adapter may provide power to the data storage device through the first and second connectors and power for consumption locally by the adapter is regulated from a 12 Volt supply in order to emulate the power consumption of a native data storage device.

In a prefered embodiment, the first interface may be a single host interface such as an ATA interface or the first interface may be a parallel interface such as a SCSI interface. The second interface may be a serial multiple host interface such as a SSA or a FC-AL interface.

According to another embodiment of the present invention there is provided a method of operation of a converted data storage device comprising an adapter and a data storage device, the data storage device having a first interface and the adapter converting the first interface to a second interface, the method comprising: the adapter receiving commands and data destined for the data storage device; the adapter converting the commands and data from the first interface to the second interface; the adapter and data storage device physically and logically emulating a higher availability and higher performance native data storage device; wherein the adapter receiving a command with a header that identifies whether the command is destined for the adapter or for the data storage device; the adapter extracting information from the header and directing the command to its correct destination.

In one embodiment, the command with a header may be a package of microcode to be downloaded. The package of microcode may have a header, microcode for the adapter and microcode for the data storage device, wherein the header includes information of the location of the adapter or data storage device microcode in the package and the length of the adapter or data storage device microcode.

In one prefered embodiment, the adapter may send a reporting field including information relating to the adapter and to the data storage device in response to an inquiry command, the receiver of the reporting field being unaware that the reporting field contains information from two components. The reporting field may report engineering change level for the adapter and the data storage device.

In a prefered embodiment, the first interface may be a single host interface such as an ATA interface or the first interface may be a parallel interface such as a SCSI interface. The second interface may be a serial multiple host interface such as a SSA or a FC-AL interface.

BRIEF DESCRIPTION OF THE DRAWINGS

An embodiment of the invention is now described, by way of example only, with reference to the accompanying drawings in which:

FIG. 1b illustrates a block diagram of a detail of FIG. 1a;

FIG. 2b illustrates a simplified side view of the disk drive of FIG. 2a;

FIG. 3b illustrates a view of a first side of the adapter of FIG. 3a;

FIG. 3c illustrates a view of a second side of the adapter of FIG. 3a; and,

DESCRIPTION OF THE PREFERRED EMBODIMENTS

The embodiments described herein use examples of disk drives with SCSI interfaces being converted to SSA interfaces; however, the disclosure is not limited to these specific types of interface or to disk drives.

Figure 1A:
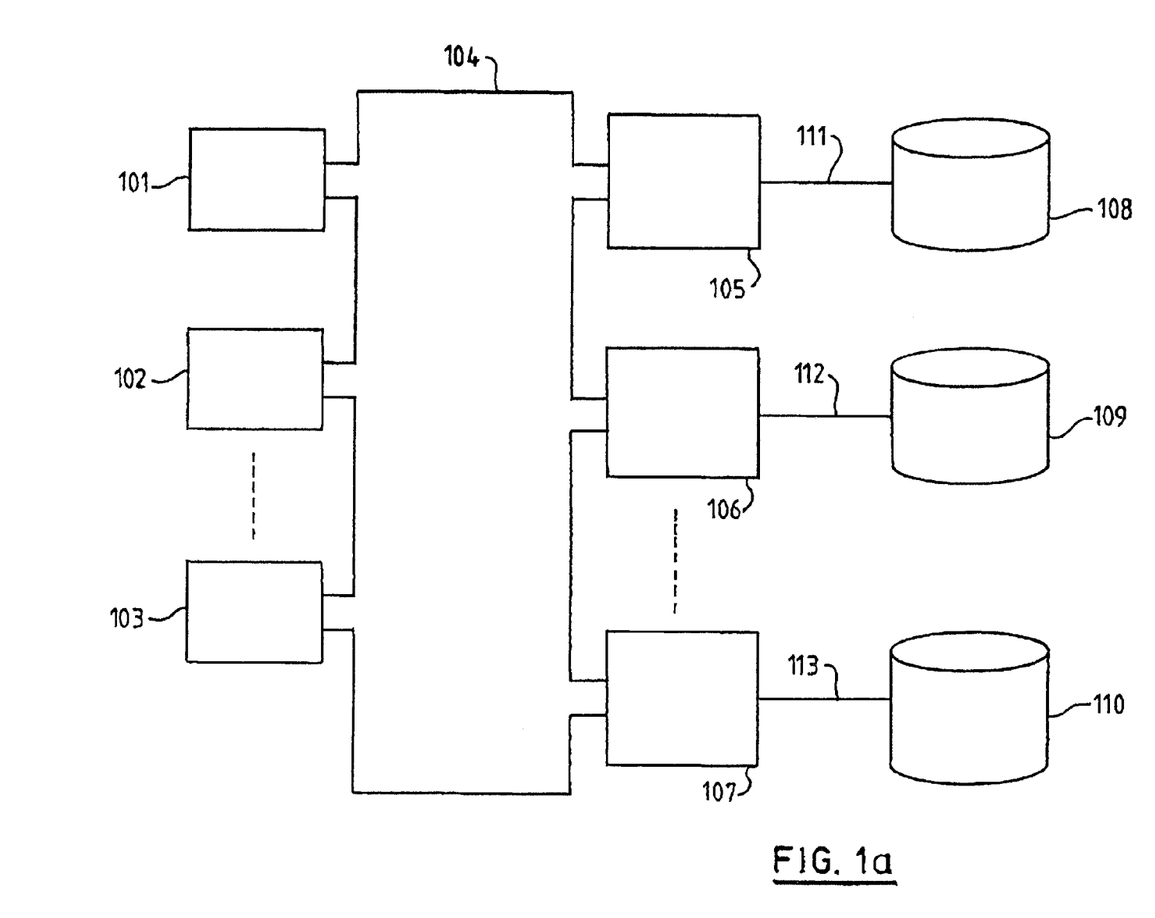
FIG. 1a illustrates a block diagram of an apparatus in accordance with the present invention.

Referring to FIG. 1a, a plurality of host computers 101, 102, 103 is provided. The host computers 101, 102, 103 have a second type of interface which is a high function, high availability interface which in this described embodiment is an SSA interface. The host computers 101, 102, 103 are connected on an SSA loop 104 which is a serial bus in a loop architecture which transmits using SSA protocol.

Also provided on the SSA loop 104 is a plurality of disk drives 108, 109, 110 that attach to the SSA loop 104 via adapters. Each disk drive 108, 109, 110 has a first type of interface in the form of an ATA or SCSI interface. Each disk drive 108, 109, 110 has an adapter 105, 106, 107 which is attached between the disk drive 108, 109, 110 and the SSA loop 104. The disk drives 108, 109, 110 are connected to the adapters 105, 106, 107 by means of buses 111, 112, 113 which transmit the protocol of the interfaces of the disk drives 108, 109, 110.

Devices other than disk drives can be converted to a high function interface such as an SSA interface using the described adapter. In the described embodiment the adapted devices are disk drives.

Figure 1B:
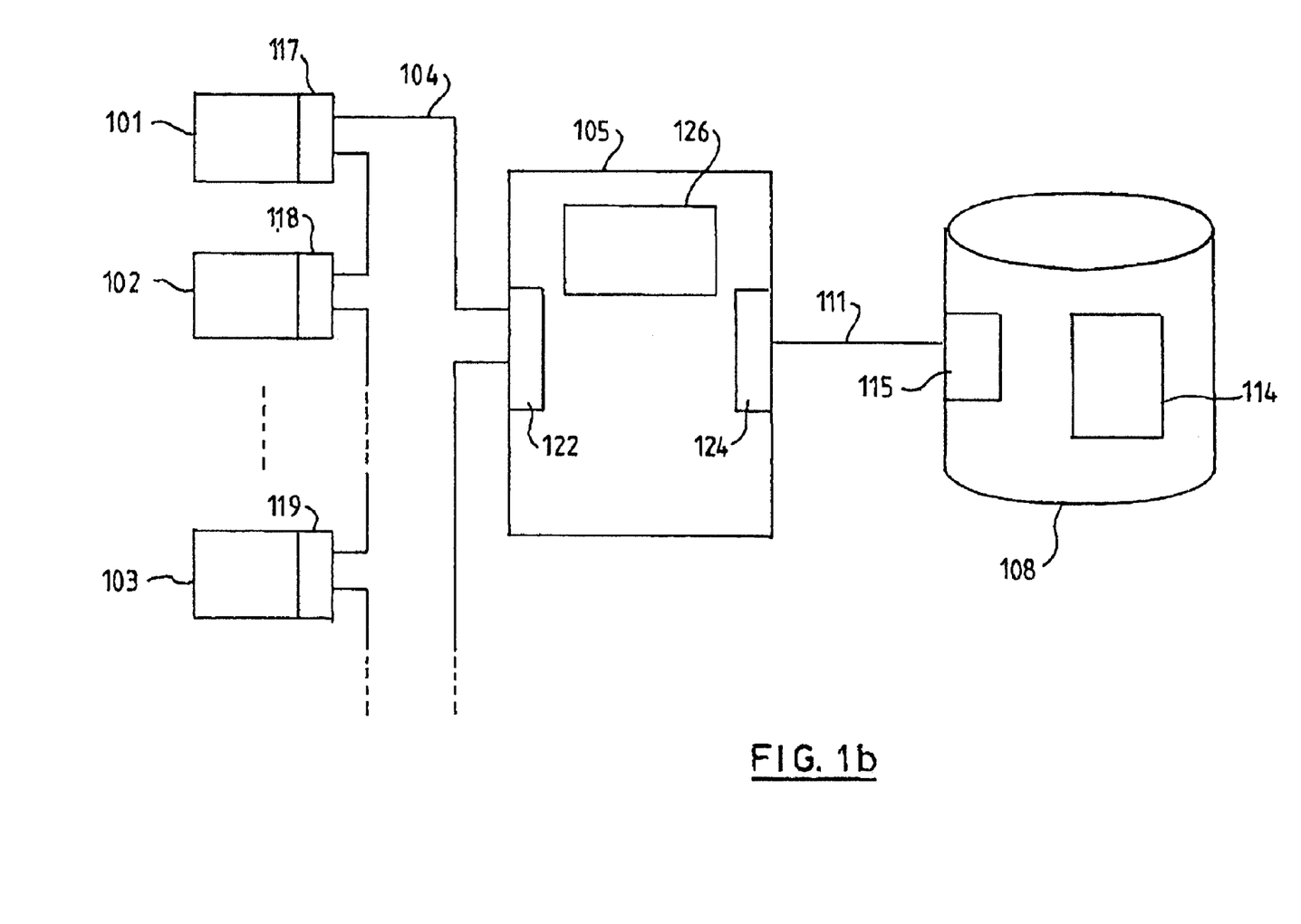

FIG. 1b is a detail of one disk drive 108 and adapter 105 of FIG. 1a. The disk drive 108 has a queue 114 for queuing commands to be executed. The disk drive 108 has an interface 115 of the first type such as an ATA or SCSI interface.

An adapter 105 is provided for converting the second type interface of the host computers 101, 102, 103 which in this described embodiment are SSA interfaces 117, 118, 119 to the first type interface of the disk drive 105 which in this described embodiment is a SCSI interface 115.

The adapter 105 has a SSA interface 122 which is connected to the host computers 101, 102, 103 by means of a SSA bus 104 which transmits SSA protocol. The SSA bus 104 has separate serial cables for outgoing and incoming data and messages. The adapter 105 also has a SCSI interface 124 which is connected to the disk drive 108 via a SCSI bus 111 which is a bi-directional parallel connection.

The adapter 105 has a processor 126 that remembers what commands have been sent to the disk drive 108 and which host computer 101, 102, 103 each command came from.

The adapter 105 is attached to the disk drive 108 through a SCSI connector. The host computers 101, 102, 103 are connected to the SSA interface 122 of the adapter 105 as though it were an interface of a disk drive.

SSA commands received by the adapter 105 from the host computers 101, 102, 103 are processed by the adapter 105 to convert the SSA commands to SCSI commands which are forwarded to the disk drive 108. The adapter 105 retains information regarding the commands sent by each host computer 101, 102, 103. Information from the disk drive 108 is sent to the adapter 105 in the form of SCSI messages and data and the adapter 105 processes these and converts them to SSA messages and data which are sent to the relevant host computer 101, 102, 103. The relevant host computer 101, 102, 103 is identified by the adapter 105 from the retained information regarding the originating command.

In this way, a disk drive 108 that is only designed to attach to a single host system (e.g. ATA) can be connected to an interface 122 designed to attach to multiple host systems. A disk drive 108 designed to attach to multiple host systems (e.g. SCSI) attached through an adapter to enable the performance and availability characteristics of a given interface (e.g. SSA) can also attach to multiple host systems. The SCSI disk drive 108 in this configuration only sees a single host system i.e. the adapter 105. The adapter 105 uses an adapter card between the interface 115 of the disk drive 108 and the host computer interfaces 117, 118, 119. The adapter contains hardware and firmware that converts from the interface protocol of the host computer interfaces 117, 118, 119 to the protocol of the disk drive interface 115.

Figure 2A:
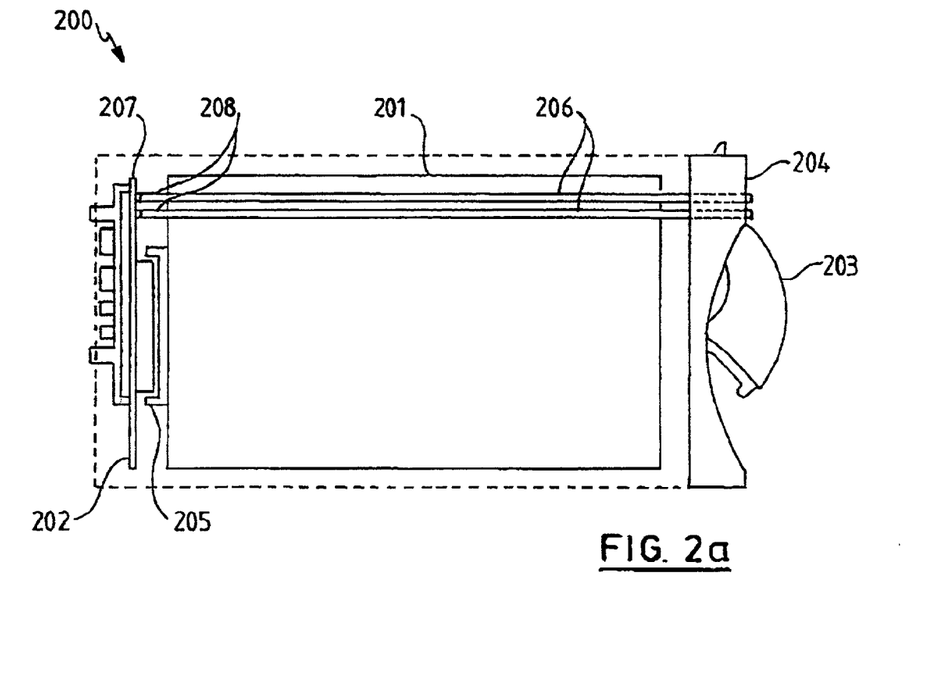
FIG. 2a illustrates a simplified plan view of a disk drive with an adapter in accordance with the present invention shown with a transparent cover.
Figure 2B:
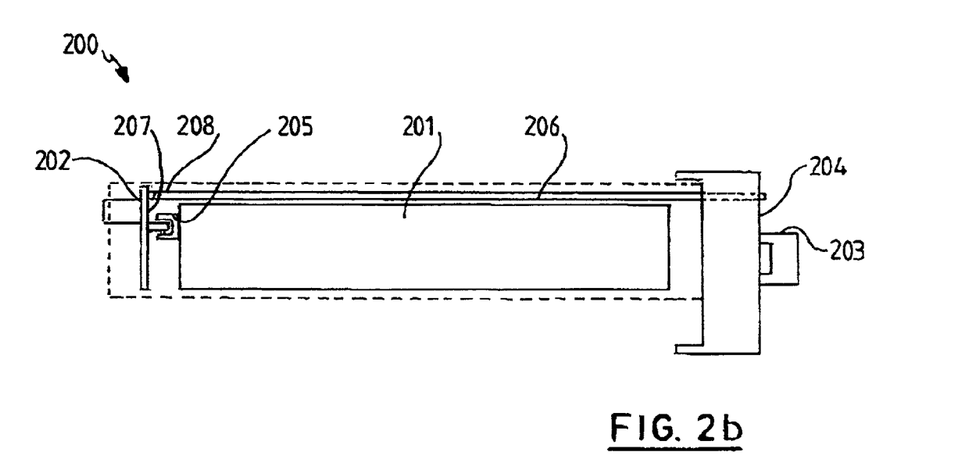

FIGS. 2a and 2b show a plan view and a side view of a carrier 200 housing a disk drive 201 with an adapter 202. Typically several carriers are mounted in an assembly termed a drawer for ease of insertion and removal. The carrier 200 can slot into a storage system and has a handle 203 on its front face 204. A conventional SCSI or ATA disk drive 201 has a connector 205 on the disk drive 201 disposed at the opposite end of the carrier 200 to the handle 203. Conventional carriers 200 housing SCSI or ATA disk drives have some room for movement of the disk drive 201 within the carrier 200. This enables the adapter 202 to be connected to the disk drive 201 via the interface connector 205 native to the disk drive 201 (which in this described embodiment is a SCSI connector 205) without modification of the native interface. The adapter 202 is housed in the carrier 200 such that the carrier physically emulates a disk drive for the interface to which the disk drive 201 is converted. The adapter 202 is removable from the disk drive 201 such that if there is a fault with the adapter 202, the disk drive 201 can still be used with its native interface or a replacement adapter and data recovered.

Figure 3A:
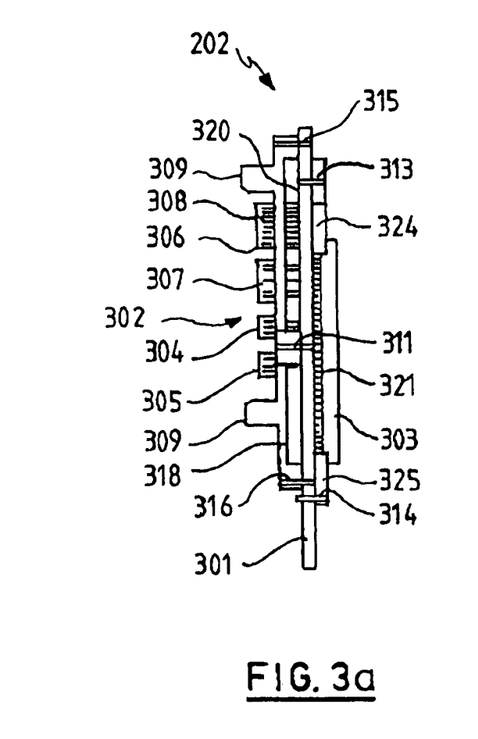
FIG. 3a illustrates a side view of an adapter in accordance with the present invention.
Figure 3B:
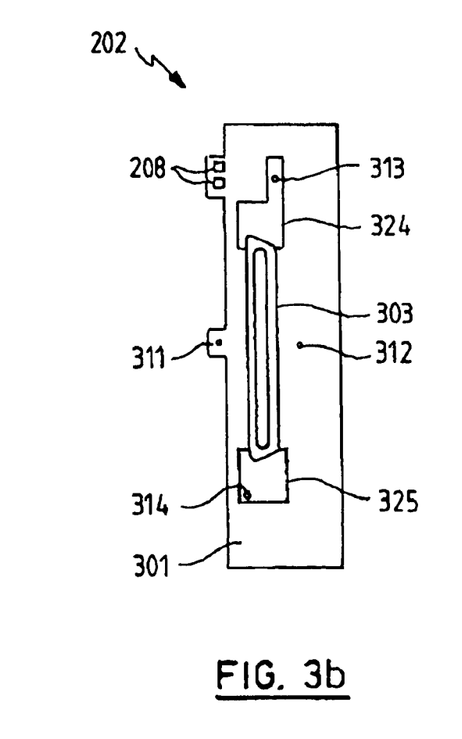
Figure 3C:
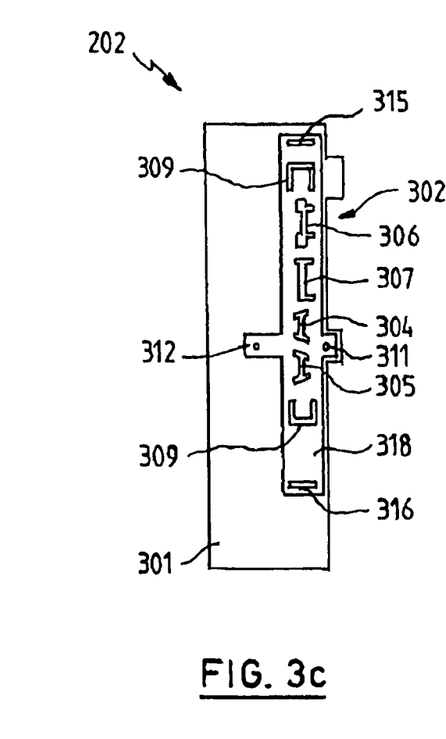

The adapter 202 is shown in detail in FIGS. 3a to 3c and is in the form of a printed circuit board 301 with back to back connectors 302, 303. One connector 302 is for a high function, high availability interface such as an SSA, FC-AL interface.

In this embodiment, the connector 302 is an SSA standard connector and as the adapter is converting the disk drive 201 to be physically like a native SSA disk drive, the connector is a male unitized or cable connector. The SSA connector 302 is a moulded and keyed set of connectors with modularized functions. Each unitized connector 302 has four functional groups of contacts, two bus bays 304, 305 for data signals, a power bay 306 to supply operating voltages to the disk drive, and an option bay 307 that includes provision for extra features. Each bay 304, 305, 306, 307 is individually keyed by its moulded shape. The bays 304, 305, 306, 307 are surrounded by a mating bay 309. A cable or device connector (not shown) matches the signals of a single bay. The contacts 308 of the connector 302 lie on the top and bottom surface of the moulded keys of the bays 304, 305, 306, 307 and can be either long or short.

The second connector 303 mates with the native connector 205 of the disk drive 201. In this described embodiment, the native interface connector 205 is a SCSI connector. In the figures, the second connector 303 and the native connector 205 are shown in the form of 80 pin SCA (Single Connector Attachment) connectors.

In order to achieve the back to back arrangement of the connectors 302, 303, the connectors 302, 303 cannot be mounted on the printed circuit board 301 using through mounted connector pins. The connector pins 320, 321 of each connector 302, 303 are surface mounted on each side of the printed circuit board 301. Surface mounting alone does not provide adequate mechanical strength and stability to the connectors 302, 303 and therefore mounting pins 311, 312, 313, 314, 315, 316 through the printed circuit board 301 are used.

The first connector 302 has a planar support 318 which is mounted parallel to the printed circuit board 301 with a small space between the printed circuit board 301 and the planar support 318. The connector pins 320 extend from the connector 302 through the planar support 318 to be soldered to the printed circuit board 301. The planar support 318 is attached to the printed circuit board 301 by means of four mounting pins 311, 312, 315, 316 which extend through the planar support 318 and the printed circuit board 301. Two of the mounting pins 315, 315 are disposed at each end of the planar support 318 and two of the mounting pins 311, 312 are disposed through extensions 322, 323 of the planar support 318 on either side of the connector 302 mid-way along the planar support 318.

The second connector 303 has two end supports 324, 325 which support the second connector 303 parallel to the printed circuit board 301 with a small space between the second connector 303 and the printed circuit board 301. The connector pins 321 of the second connector 303 extend from the underside of the second connector 303 and are surface mounted on the printed circuit board 301. A mounting pin 313, 314 extends though each of the end supports 324, 325 and the printed circuit board 301.

In this way, the connectors 302, 303 can be mounted back to back in a space-saving arrangement which allows the adapter 202 to convert the disk drive 201 to be physically similar to a native disk drive whilst providing mechanical strength and stability to the connectors 302, 303.

In an alternative embodiment, the connectors 302, 303 could be mounted on separate printed circuit boards in a back to back arrangement, with cables connecting the two printed circuit boards.

The adapter 202 has LEDs 208 provided on the inner face 207 of the adapter 202 which indicate the operation of the adapter 202. Light pipes 206 can be provided between the inner face 207 of the adapter 202 and the front face 204 of the carrier 200. Light from LEDs 208 on the printed circuit board 301 of the adapter 202 is transmitted via the light pipes 206 to the front face 204 of the carrier 200 and can be seen when the carrier 200 is encased in a storage system.

The described adapter 202 enables the converted disk drive 201 to emulate electrically a native disk drive. As well as providing for the translation of the protocol between the first and second interfaces, the adapter 202 must provide power to the disk drive 201 through the unitised connector 302, and the adapter 202 must be provided with power for its own function.

In disk drive sub-systems, power is typically provided to the disk drives as a 12V supply for motors (spindle and actuator) and a 5V supply for the electronics of the disk drive. More power is typically available from the 12V supply. In order not to increase the 5V power consumption of the converted device (comprising a native disk drive plus the adapter), the power for the adapter is regulated locally on the adapter card from the 12V supply. This results in a modest increase in the 12V power consumption providing the 5V and 3.3V power required by the adapter.

As well as the adapter 202 converting a disk drive 201 with a first type interface to physically act as a disk drive with a second type interface, the adapter 202 also enables the disk drive 201 to logically act as if it had a second type interface in the form of a high function, high availability interface such as an SSA interface which supports multiple hosts.

An adapter can be used to connect a data storage device such as a disk drive to a different interface that has much higher function capability than is available with the interface native to the device. This can then provide much higher availability for interface failures than is available with the native interface and also allows devices to be removed and replaced without disrupting operations to other devices on the interface. The device attached to a different interface appears as a single unit on the new interface and all the host commands from the host to which the device is attached are directed to the device as though it was a single device on the new interface.

All commands are destined for the data storage device but the adapter strips off some of the data that has been sent on some commands and uses it for the adapter's own purposes. The adapter also implements the function of combining data from the data storage device and data from the adapter into a single response, so that a host is unaware that separate components are being sent.

Microcode download must be achieved to the two separate entities which are the adapter and the device from a host that considers the device to be a single unit.

Download of new microcode is achieved by a single command to the device that supplies all the new microcode starting from a specified host memory location. The microcode package that is downloaded consists of three areas—the header, the adapter microcode and the device microcode.

Figure 4:
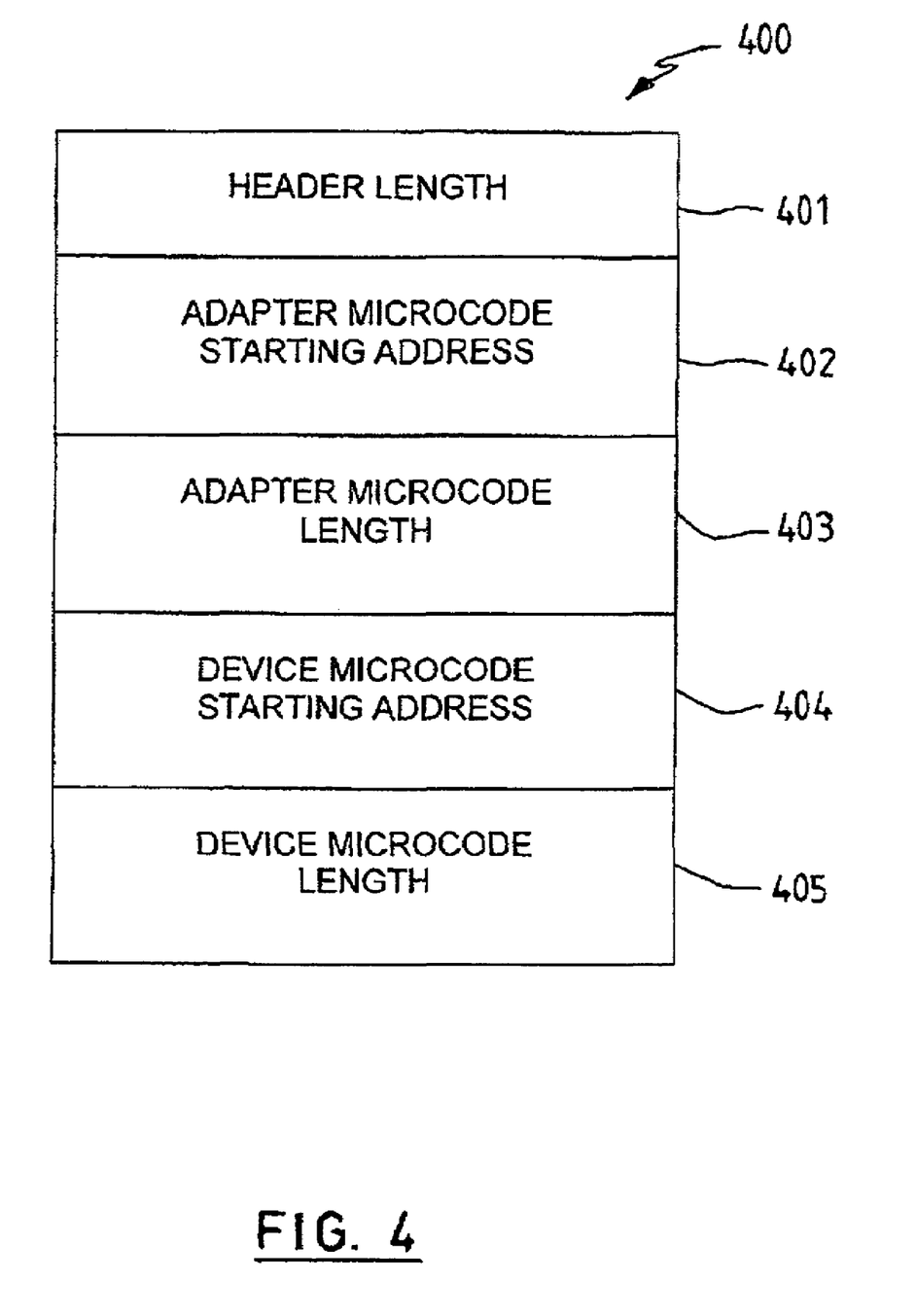
FIG. 4 illustrates a diagram of a microcode header in accordance with the present invention.

Header area—This consists of fields that define the length of the header, the starting address of the adapter microcode and the length of the adapter microcode and the starting address of the device microcode and the length of the device microcode. FIG. 4 shows a header area 400 which provides information on the header length 401, the adapter microcode starting address 402 and the adapter microcode length 403, the device microcode starting address 404 and the device microcode length 405.

Adapter microcode—This is the new microcode for the adapter.

Device microcode—This is the new microcode for the device.

When the download microcode command is received by the adapter it determines from the header data where the new adapter microcode is located in the following data and rewrites the adapter memory accordingly. From the header information it locates the new microcode for the device and supplies this to the device by issuing a command across the interface to the device to download new code to the device. When both the download to the adapter and the download to the device have completed, the host is informed that the original download command has completed.

With this technique it is possible to download new microcode to either the adapter, or to the device or to both as this information is held in the header.

The host is unaware that there are two quite separate devices attached that have their own processor and microcode and so no change is required to host applications for download of microcode to a device that attaches to the host interface even though this unit now consists of two separate units connected by another interface.

In order for the adapter plus disk attaching to the SSA interface to be transparent from a SSA disk attaching to the SSA interface, the adapter plus disk must appear as a single device.

For some information, for example reporting the engineering change level of the hardware, separate data must be returned for the adapter and for the disk drive.

In order to manage the manufacturing and provisioning of spare parts it is common to define for each sub-assembly in a system an identifier that describes the combination of design changes that are embodied in a given sub-assembly. Such an identifier is described as an "Engineering change" level or EC level.

In the case of a disk drive carrier sub-assembly, the EC level that is reported by the sub-assembly to the host is a ten character field. For composite sub-assembly such as the combination of disk drive and adapter described herein, the adapter and the disk drive each have a separate EC level that need to be reported to fully understand the level of the hardware being used.

The engineering change level of an SSA disk drive is reported using a 10 byte field in an Inquiry command. In order to report the change level of both the adapter and the disk drive using the same Inquiry command, the adapter creates a 10 byte field to report a composite field. The 10 byte field engineering change level field reported by the adapter in an Inquiry command consists of the lowest 5 bytes of the disk drive engineering change level in bytes 1–5 and the lowest 5 bytes of the adapter engineering change level in bytes 6–10. Anyone using this information reported in an Inquiry command can then determine exactly what the engineering change level is of each component of the adapter plus disk drive combination. The host computer is unaware that the information that has been returned is a composite of information from two components.

One disadvantage of adding an extra component to the disk drive is that there will be an increased rate of failure of the combined disk plus adapter compared to the failure rate of just the disk drive. This means that data will be lost more frequently due to failures.

To avoid data being lost more frequently in the disk plus adapter configuration, all adapter failures are reported using error codes that cannot be reported due to disk failures. The service action to recover from failures that report these new error code is to change the adapter card without changing the disk drive. As the disk drive is not replaced after these failures, no data on the disk is lost.

Improvements and modifications can be made to the foregoing without departing from the scope of the present invention.

What is claimed is:

1. An adapter for converting an interface of a data storage device, comprising:

a first interface for connection to the interface of the data storage device;

a second interface for connection to one or more host systems; and, a processor including conversion means for converting commands and data between the first and second interfaces, wherein the adapter transforms the data storage device to emulate physically and logically a higher availability and higher performance native data storage device, the adapter having a first connector compatible with the first interface for attachment to the data storage device and a second connector compatible with the second interface for attachment to the one or more host systems, the first and second connectors being disposed in the adapter in a back to back arrangement and the adapter logically separating data destined for the adapter from commands destined for the data storage device.

2. An adapter as claimed in claim 1, wherein the adapter comprises a printed circuit board with the first connector mounted on a first surface of the printed circuit board and the second connector mounted on a second surface of the printed circuit board, wherein the first and second connectors are disposed on supports mounted with mounting pins through the printed circuit board.

3. An adapter as claimed in claim 1, wherein the adapter is mountable within a data storage device housing with the second connector disposed available for attachment to the one or more host systems via the second interface.

4. An adapter as claimed in claim 3, wherein the adapter is mountable within a carrier housing for a data storage device in the form of a disk drive such that the disk drive and adapter physically emulate a disk drive with a native second interface.

5. An adapter as claimed in claim 4, wherein the adapter has one or more indicator devices and a transmission means for transmitting the indication to the exterior of the carrier housing.

6. An adapter as claimed in claim 5, wherein the indicator device is an LED and the transmission means is a light pipe.

7. An adapter as claimed in claim 1, wherein the adapter provides power to the data storage device through the first and second connectors and power for consumption locally by the adapter is regulated from a 12 Volt supply in order to emulate the power consumption of a native data storage device.

8. An adapter as claimed in claim 1, wherein the first interface is a single host interface.

9. An adapter as claimed in claim 1, wherein the first interface is a parallel interface.

10. An adapter as claimed in claim 1, wherein the second interface is a serial multiple host interface.

11. An adapter as claimed in claim 1, wherein the first interface is an ATA or SCSI interface and the second interface is a SSA or a FC-AL interface.

12. A converted data storage device, said data storage device comprising an adapter and a data storage device, said data storage device also having a first interface and the adapter converting the first interface to a second interface, the adapter comprising:

a first interface for connection to the interface of the data storage device;

a second interface for connection to one or more host systems; and, a processor including conversion means for converting commands and data between the first and second interfaces, wherein the adapter transforms the data storage device to emulate physically and logically a higher availability and higher performance native data storage device, the adapter having a first connector compatible with the first interface for attachment to the data storage device and a second connector compatible with the second interface for attachment to the one or more host systems, the first and second connectors being disposed in the adapter in a back to back arrangement and the adapter logically separating data destined for the adapter from commands destined for the data storage device.

13. A converted data storage device as claimed in claim 12, wherein the adapter is removable from the data storage device.

14. A converted data storage device as claimed in claim 12, wherein the adapter is mountable within a housing of the data storage device with the second connector disposed available for attachment to the one or more host systems via the second interface.

15. A converted data storage device as claimed in claim 14, wherein the adapter is mountable within a carrier housing for a data storage device in the form of a disk drive such that the disk drive and adapter physically emulate a disk drive with a native second interface.

16. A converted data storage device as claimed in claim 15, wherein the adapter has one or more indicator devices and a transmission means for transmitting the indication to the exterior of the carrier housing.

17. A converted data storage device as claimed in claim 16, wherein the indicator device is an LED and the transmission means is a light pipe.

18. A converted data storage device as claimed in claim 12, wherein the adapter provides power to the data storage device through the first and second connectors and power for consumption locally by the adapter is regulated from a 12 Volt supply in order to emulate the power consumption of a native data storage device.

19. A converted data storage device as claimed in claim 12, wherein the first interface is a single host interface.

20. A converted data storage device as claimed in claim 12, wherein the first interface is a parallel interface.

21. A converted data storage device as claimed in 12, wherein the second interface is a serial multiple host interface.

22. A converted data storage device as claimed in claim 12, wherein the first interface is an ATA or SCSI interface and the second interface is a SSA or a FC-AL interface.

23. A method of operation of a converted data storage device, said data storage device comprising an adapter and a data storage device, said data storage device also having a first interface and the adapter converting the first interface to a second interface, said method comprising:

receiving commands and data destined for the data storage device;

converting the commands and data from the first interface to the second interface;

emulating physically and logically a higher availability and higher performance native data storage device;

receiving by the adapter a command and data destined for the data storage device with a header that identifies whether the data is destined for the adapter or for the data storage device; and, extracting information from the header and directing the data to its correct destination.

24. A method as claimed in claim 23, wherein the command and data with a header is a package of microcode to be downloaded.

25. A method as claimed in claim 24, wherein the package of microcode has a header, microcode for the adapter and microcode for the data storage device, wherein the header includes information of the location of the adapter or data storage device microcode in the package and the length of the adapter or data storage device microcode.

26. A method as claimed in claim 23, wherein the first interface is a single host interface.

27. A method as claimed in claim 23, wherein the first interface is a parallel interface.

28. A method as claimed in claim 23, wherein the second interface is a serial multiple host interface.

29. A method as claimed in claim 23, wherein the first interface is an ATA or SCSI interface and the second interface is a SSA or a FC-AL interface.

* * * * *